INVENTOR:
HELMUT HEIMBERGER

BY
Karl F. Ross
ATTORNEY

United States Patent Office 3,609,827
Patented Oct. 5, 1971

3,609,827
SLIDE-FASTENER STRINGER WITH HELICOIDAL COUPLING ELEMENTS
Helmut Heimberger, Essen, Germany, assignor to Opti-Holding AG, Glarus, Switzerland
Filed Apr. 20, 1970, Ser. No. 30,195
Claims priority, application Germany, Apr. 22, 1969,
P 19 20 443.4
Int. Cl. A44b *19/12*
U.S. Cl. 24—205.13 C                 10 Claims

ABSTRACT OF THE DISCLOSURE

A slide-fastener stringer having a pair of generally helicoidal coupling elements with spaced-apart constant pitch coupling heads interfittable with one another and deformed from a circular-section monofilament. The heads, of elliptical section, are generally circular segments in projection in a plane perpendicular to the longitudinal axis to the coupling elements so as to define a pivot or hinge axis through the centers of the coupling heads.

---

The present invention relates to slide fasteners and especially slide fasteners of the type in which a pair of substantially continuous coupling elements, mounted upon confronting edges of respective support tapes, have interfitting heads substantially uniformly spaced along the coupling elements and deformed from the successive turns or convolutions thereof; more particularly, this invention relates to slide fasteners and slide-fastener stringers, as well as to coupling elements for such stringers, in which the coupling elements are of generally helicoidal configuration and extend continuously over the entire stringer length for interconnection upon movement of a slider along the coupling elements.

In conventional snagless slide-fastener constructions, the slide-fastener stringer generally comprises a pair of support bands or tapes having confronting edges which may be spaced apart or may contact one another in the closed condition of the slide fastener, depending upon the construction of the coupling elements mounted upon these support tapes.

The coupling elements are generally helicoidal or substantially helicoidal coils formed from a continuous molecularly oriented synthetic-resin filament (monofilament) of a nylon-type polyamide or the like, or are undulating structures of substantially constant pitch.

The turns of a helicoidal coupling element and the convolutions of an undulated coupling element are deformed, usually under heat and pressure, to produce a widening or enlargement, hereinafter referred to as a "head," the heads of the mating coupling elements engaging behind one another and between the heads of the opposed coupling element to prevent separation of the coupling element in a direction traverse to their longitudinal axis. Joined to the heads of the coupling element, each turn or convolution may be a pair of shanks which extend away from the engaging portions and overlie the support band or tape for anchorage thereto.

There are, of course, constructions in which the shanks of the coupling elements are received within a support tape, arrangements in which the coupling elements are woven in place and systems in which the coupling elements are secured to the support tapes by adhesives, inherent shrinkage of a fabric material, thermal or solvent fusion or the like. Most frequently, however, the coupling elements are attached to the support tape by chain-stitching inwardly of the bights of the coupling element interconnecting the shanks of successive heads, the stitches passing around these shanks. To facilitate such connection, a filler cord may be provided within the coupling element and can be engaged or stitched through by the fastening means while a bead or welt along the outer flank of the bight portion of the coupling element to serve as positioning and anchoring means, or merely as a guide for the slider.

As will be evident from the foregoing, various types of support tape have been provided heretofore. Thus, the support tape may constitute a thermoplastic or thermoplastic-reinforced tape or band, a fabric band which may be treated for greater stiffness, a rubberized fabric of the knitted or woven type, etc. Similarly, various configurations of the coupling elements have been provided and, for the sake of simplicity, this discussion will concentrate on coil-type coupling elements.

In one category of coil-type coupling elements, there are various cross sections of the coil when viewed along the axis thereof (i.e. in axial projection). Thus it has been proposed to provide elliptical, circular, polygonal and like sections.

Another classification may be based upon the head configuration, although generally the head is simply formed by flattening corresponding portions of each turn along one side of the coupling element to provide protuberances which extend in the axial direction of the coupling element and are engageable behind similar protuberances of a complementary coupling element. These protuberances can, in turn, be provided with formations coupling with the formations of the mating element to limit laterally displacement of the coupling elements or resist traverse stress. The interengaging protuberances, of course, resist the tendency to draw the coupling elements apart in their plane and, therefore, prevent opening of the slide fastener by tension employed in the plane of the fabric, whereas the additional formations resist separation of the coupling elements by stresses applied traversely to the plane of the fabric. Such stresses most frequently develop in garments and, while coil-type coupling elements have the advantage that they are substantially snag-free, can be made inconspicuous and are readily opened and closed, they have been prone to opening as a result of such stresses in the prior-art constructions.

Perhaps the most accepted slide-fastener construction of this general type provides, for each of the coupling heads, two shanks which in projection perpendicular to the slide-fastener plane, more or less overlap and at least to an extent lie in a plane perpendicular to the slide-fastener plane and to the longitudinal axis of the coupling element. Between these generally planar shanks and the generally planar shanks of the adjacent pair of coupling heads, extend arcuate portions of the monofilament in the form of the "bights" mentioned earlier.

In practice, these constructions lead to a relatively deep interfitting of the coupling elements and a relatively large degree of overlap of the coupling elements upon the fabric tape, i.e. the coupling elements extend inwardly from the confronting edges of the tapes. As a result, a stiff junction is formed between mutually engaging coupling heads and their shanks while a pivotal connection is precluded. The lack of a pivotal junction along their line of mating, creates at each location a lever-like action under the torque developed when the coupling elements are stressed outside the slide-fastener plane and multiplies the force with which the heads tend to be withdrawn from between the mating pair of heads of the other coupling element. Such stresses, moreover, have the tendency to develop because of a lack of flexibility at the coupling region.

There is, in the prior art, a slide-fastener structure wherein a pair of generally helicoidal coils constitute the coupling elements on the opposing tapes of a stringer, the coils having opposite rotational senses, i.e. as viewed from one end in the direction of the axis, one of the coils is wound in the clockwise sense while the other coil is wound in the counter-clockwise sense. Such arrangements have, however, the disadvantage that they require special configurations of the monofilament cross section, thereby increasing the cost of the coupling element and creating difficulties with respect to attachment to the tape, that they have complex head structures which may limit the flexibility of the interconnected stringer, that they require fillet cords, beads or stitching cords which have a tendency to restrict movement of the slider once the garment carrying the stringer is washed or cleaned and that they are unsatisfactory when attached by overedge sewing since the coupling elements may then contact the skin of the wearer or the undergarments thereof with resulting discomfort. In general, such coupling elements have not proven to be satisfactory in many garments and have been difficult to secure satisfactorily to the support tapes.

It is the principal object of the present invention to provide an improved coupling element construction whereby a stringer incorporating same will have increased flexibility by comparison with earlier coupling-element configurations.

It is another object of the invention to provide an improved coupling element for slide fasteners and the like which facilitates attachment to support tapes and permits such attachment without the disadvantages of prior-art systems, i.e. without requiring overedge attachment or the use of cords and the like which may interfere with slider operations after washing or cleaning.

Still another object of this invention is the provision of a slide-fastener stringer having improved coupling elements adapted to lock together so as to resist stress in the plane of the slide fastener or transversely to this plane.

It is also an object of the instant invention to provide a slide-fastener arrangement which, in the interconnected state of the stringer halves, manifests greater flexibility than prior-art systems and yet can be assembled easily and without the disadvantages of earlier methods of attaching the coupling elements to the support tapes.

It is still another object of the invention to provide a slide-fastener stringer, especially for use in garments and the like, which is of greater reliability than earlier systems, provides snag-free performance, and yet has greater flexibility and resistance to torque than earlier arrangements.

These objects and others which will become apparent hereinafter are attained, in accordance with the present invention, with a slide-fastener stringer comprising a pair of stringer halves each including a support tape or band, and a continuous monofilamentary helically coiled coupling element along an edge of the tape confronting the other slide-fastener half and interengageable with the coupling element thereof, the coupling elements of the stringer being wound in opposite senses as this concept has been defined above. Thus, viewing the coupling elements in the axial direction, e.g. from either end, one of the coupling elements is wound in the clockwise sense while the other coupling element is wound in the counterclockwise sense.

In accordance with the principles of this invention, both coupling elements consist of a synthetic resin monofilament of circular cross section over the major portion of the length of each turn, while only the heads are deformed into a generally elliptical configuration, the contours of the ellipse being defined by a generatrix inclined slightly toward the longitudinal axis of the interconnected coupling elements and rotated about this axis at least through approximately 180° of arc.

Aside from this elliptical formation at each head, which is of circular-segmental cross section in a plane perpendicular to the axis, the coupling element is constituted entirely of a circular-section monofilament. The coupling heads engage at their flanks on opposite axial sides of each head as defined by the ends of the elliptical section and interfit by virtue of a slight conicity as will be apparent hereinafter.

The interengaged heads of the coupling elements define generally cylindrical hinge extending along the coupling axes and permitting pivotal movement of one coupling element relative to the other along the generally circular surfaces at which the coupling heads engage. As a consequence the interconnected coupling elements and slide-fastener halves, in the locking condition, act as the elements of a hinge strip or "piano" hinge in which the hinge axis coincides with the coupling axis. Immediately inwardly of the circular coupling surfaces of the heads, the individual turns or convolutions are formed with circular cross sections, thereby enabling the stitching of the shanks of the turns to the support band around the individual circular-section portions or shanks.

It is an important feature of the invention that, apart from the opposite senses of the respective helices, all corresponding parts of the turns of one of the coupling elements are spaced apart with the same pitch. In other words, not only are the heads of the coupling element divided with the critical pitch, but each and every portion of the shanks and of the bights of the turn of the coupling element is spaced from the corresponding portions of the neighboring turns by exactly the same pitch.

According to a further feature of this invention, the turns are so arranged that, in projection of the coupling element in a plane parallel to the axis but parallel to a further plane including this axis and constituting the median between two shanks of the turns of the coupling element, each turn is generally V-shaped. Preferably the shanks of the turns of each coupling element lie in respective planes which are inclined toward one another and symmetrical with respect to this median plane away from the pivot axis mentioned earlier.

The above and other objects, features and advantages of the present invention will become more readily apparent from the following description, reference being made to the accompanying drawing in which.

Figure 1:
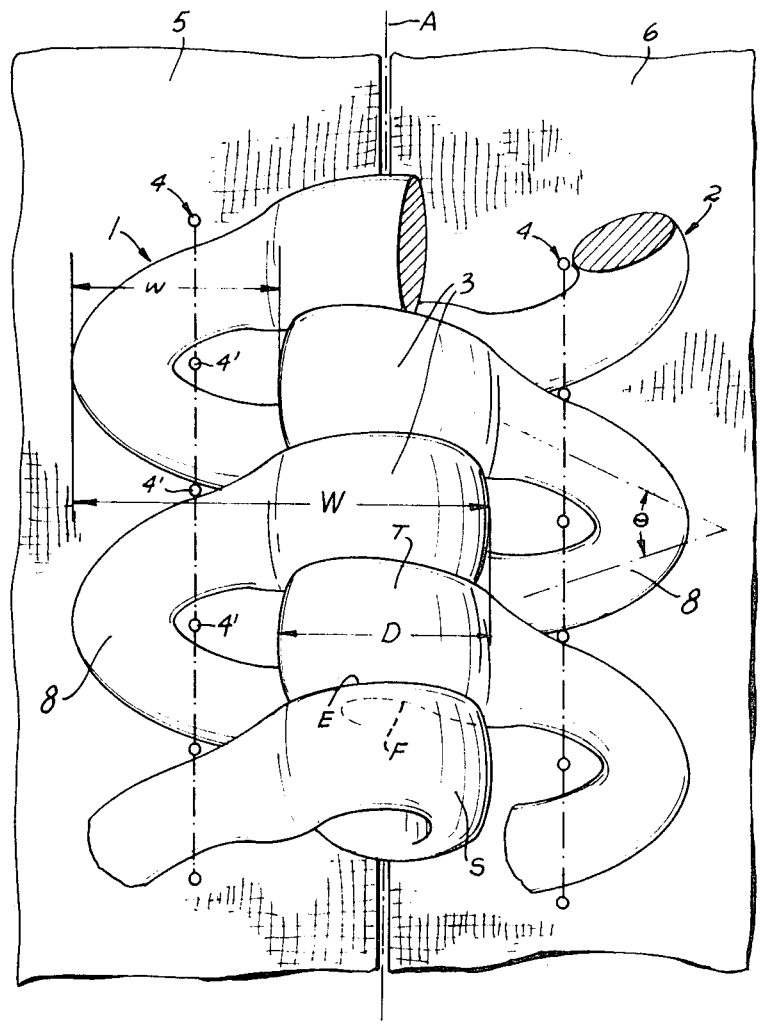
FIG. 1 is a plan view partly broken away and partly in diagrammatic form of a portion of a slide fastener embodying the present invention.

The drawing illustrates a slide-fastener stringer comprising two oppositely wound helical coupling elements 1 and 2, the former turning in the clockwise sense while the latter is considered as turning in the counterclockwise sense. Each turn of the coupling elements, which are composed of circular-section synthetic-resin monofilament, e.g. a polyamide such as nylon, comprises coupling heads 3 of elliptical cross section extending in an arc and interengageable to define the longitudinal axis A, hereinafter referred to as the stringer longitudinal axis. The coupling heads 3 are formed directly upon the mandrel, e.g. by thermally pressing the turns of circular-section monofilament with a heated embossing roller.

Each coupling element is secured to its support tape 5 or 6 by a respective row of chainstitches represented diagrammatically at 4 and including loops piercing the support tapes at 4' between each shank of each coupling head and the neighboring shank.

Figure 3:
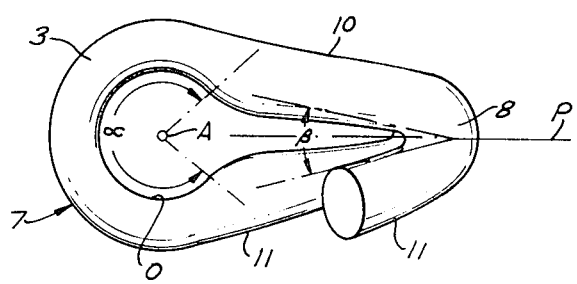
FIG. 3 is an end view of a coupling element.

The coupling heads interfit to a depth D in the respective turns equal approximately to twice the width W of the coupling element as measured in a projection on a plane parallel to that of the stringer, i.e. a plane parallel to the paper in FIG. 1. Furthermore, the heads interfit to a depth equal to the width of the heads themselves to that the dimension D can also be considered as the width of the elliptical-section portion of each turn. As a result, the two coupling elements form relatively rotatable members of a hinge having its hinge axis represented at A. Over the remaining portion of the width $w = W - D$, the synthetic resin monofilament is of circular section as noted. In the region of the heads 3, best seen in FIG. 3, the coupling heads extend angularly over an angle $\alpha$ in excess of 180° (here represented at 270°), as viewed in a plane perpendicular to the axis A, i.e. a plane parallel to the plane of the paper of FIG. 3. The elliptical portion extends over this entire arc 7. The shanks 10 and 11 of each coupling head are inclined toward one another and away from the axis A so as to provide a V profile in projection on the plane perpendicular to the axis A as best seen in FIG. 3 while the shank of adjacent coupling heads are interconnected by bights as represented at 8. Throughout the shanks 10, 11 and the bights 8, the synthetic resin monofilament maintains its circular section. All parts of the coupling elements have essentially identical pitches and geometrically approximate a tight screwthread.

Figure 2:
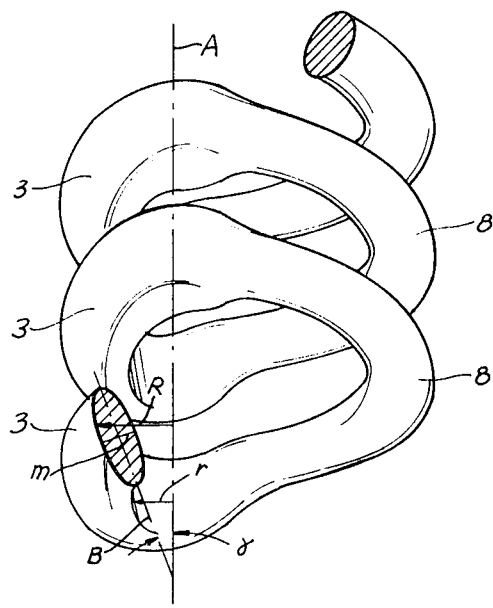
FIG. 2 is a perspective view of a fragment of the coupling element used in FIG. 1.

Referring again to FIG. 3, it will be apparent that the coupling element has a plane of symmetry P also described as a median plane including the axis A and to which the shanks 10 and 11 converge to include an angle $\beta$ of approximately 20°. Moreover, the major axis B of the ellipse defining the cross section of the coupling head is inclined slightly to the axis A (see FIG. 2) so as to define an angle $\gamma$ therewith which may range from 5° to 30° so that the radius of curvature $r$ at one axis end of each coupling head is less than the radius of curvature R at the other axial end by approximately half the minor axis $m$ of the ellipse. Moreover, the major axis B constitutes a generatrix of a right circular cone centered on the axis A. Consequently, the forward end F of one turn I is received within the rearward end E of the complementary turn S of the adjacent coupling element. In a plan view taken parallel to the axis A and corresponding to FIG. 1, the shanks 10 and 11 also converge to an acute angle $\theta$ here shown to be approximately 45° but which may range in accordance with the pitch and the diameter of the synthetic resin filament from 15° to 60°. The coupling elements may of course be formed on a mandrel of a profile corresponding to the opening O shown in FIG. 3 and serving to support the coupling element as the heads 3 are hot-pressed in the monofilament solely by material flow and without addition or subtraction of material.

The improvement described and illustrated is believed to admit of many modifications within the ability of persons skilled in the art, all such modifications being considered within the spirit and scope of the invention except as limited by the appended claims.

I claim:

1. A slide-fastener stringer comprising a pair of support tapes having mutually confronting edges, and a pair of continuous synthetic-resin monofilament coupling elements respectively mounted on said tapes along said edges and interengageable upon displacement of a slider along said coupling elements, said coupling elements being formed as generally helicoidal coils of opposite winding senses and turns of identical pitch each formed along a corresponding side with a coupling head engageable between the coupling heads of the other coupling element, said turns being of circular cross section over their entire length except for said heads, said heads being of elliptical cross section and interfitting upon interconnection of said coupling elements to define a hinge axis between them, and said heads extending over arcs through at least 180° about said axis and having said elliptical cross section throughout said arcs.

2. The slide-fastener stringer defined in claim 1 wherein said coupling elements are affixed to the respective support tapes by respective rows of stitching extending around said turns at circular portions thereof.

3. The slide-fastener stringer defined in claim 2 wherein said coupling elements each include a pair of shanks for each turn extending away from the respective head and connected to the shanks of an adjoining turn by a respective bight, said shanks and said bights being of circular cross section throughout.

4. The slide-fastener stringer defined in claim 3 wherein said heads extend over arcs that are circular.

5. The slide-fastener stringer defined in claim 4 wherein said rows of stitching include respective stitches entering the respective tape between each shank and a neighboring shank of the corresponding coupling element.

6. The slide-fastener stringer defined in claim 4 wherein the shanks of each turn are inclined toward one another away from said axis to impart to each turn a V-shaped profile in projection in a plane perpendicular to said axis.

7. The slide-fastener stringer defined in claim 6 wherein each shank and the shank of a neighboring turn of a respective coupling element are inclined toward one another away from said axis to define a V configuration in projection on a plane parallel to said axis.

8. The slide-fastener stringer defined in claim 7 wherein corresponding parts of all of the turns of each coupling element are equispaced with identical pitch.

9. The slide-fastener stringer defined in claim 8 wherein the elliptical section of each of said heads has a major axis in a plane of the hinge axis which is inclined to the hinge axis, said heads having a radius of curvature at one axial end less than the radius of curvature of the head at the other axial end of each head.

10. The slide-fastener stringer defined in claim 9 whereing said heads extend over arcs of substantially 270° and said heads interfit to a depth substantially equal to half the width of the coupling elements.

References Cited

UNITED STATES PATENTS

| 2,919,482 | 1/1960 | Casson | 24—205.13–C |
| 3,490,110 | 1/1970 | Frohlich | 24—205.16–C |

FOREIGN PATENTS

| 1,476,077 | 2/1967 | France | 24—205.13–C |
| 6804791 | 10/1968 | Netherland | 24—205.16–C |

BERNARD A. GELAK, Primary Examiner

U.S. Cl. X.R,

24—205.1–C